US008505284B2

(12) United States Patent  
Li et al.

(10) Patent No.: US 8,505,284 B2
(45) Date of Patent: Aug. 13, 2013

(54) STRATIFIED PARTICULATE FILTER REGENERATION SYSTEM

(75) Inventors: Jianwen Li, West Bloomfield, MI (US); Rahul Mital, Rochester Hills, MI (US); Michael V. Taylor, Wolverine Lake, MI (US); Thomas Larose, Jr., Howell, MI (US); Thomas J. Sobtzak, Otisville, MI (US); Paul Jasinkiewicz, Northville, MI (US); Rebecca J. Darr, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 113 days.

(21) Appl. No.: 13/190,573

(22) Filed: Jul. 26, 2011

(65) Prior Publication Data

US 2013/0025266 A1 Jan. 31, 2013

(51) Int. Cl.
F01N 3/00 (2006.01)
(52) U.S. Cl.
USPC ............. 60/295; 60/285; 60/286; 60/297
(58) Field of Classification Search
USPC .................................. 60/285, 286, 295, 297
See application file for complete search history.

(56) References Cited

U.S. PATENT DOCUMENTS

| | | | | |
|---|---|---|---|---|
| 5,130,100 A | * | 7/1992 | Serizawa | 422/180 |
| 5,144,798 A | * | 9/1992 | Kojima et al. | 60/303 |
| 5,171,335 A | * | 12/1992 | Kojima et al. | 55/523 |
| 5,305,602 A | * | 4/1994 | Kojima et al. | 60/286 |
| 5,651,248 A | * | 7/1997 | Kawamura | 60/286 |
| 6,673,414 B2 | * | 1/2004 | Ketcham et al. | 428/116 |
| 6,948,311 B2 | | 9/2005 | Schaller et al. | |
| 7,171,803 B2 | | 2/2007 | Saito et al. | |
| 7,238,217 B2 | * | 7/2007 | Cutler et al. | 55/523 |
| 7,326,271 B2 | * | 2/2008 | Kasai et al. | 55/523 |
| 7,343,738 B2 | * | 3/2008 | Tsutsumoto et al. | 60/295 |
| 8,011,177 B2 | | 9/2011 | Cheng | |
| 8,265,852 B2 | | 9/2012 | Yanakiev et al. | |
| 8,327,621 B2 | | 12/2012 | LaRose, Jr. et al. | |

(Continued)

FOREIGN PATENT DOCUMENTS

DE 10056016 A1 5/2002
DE 102005008529 A1 9/2005

(Continued)

OTHER PUBLICATIONS

Office Action relating to corresponding DE Application No. 10 2012 212 884.0; dated Apr. 2, 2013; 9 pgs.

*Primary Examiner* — Thomas Denion
*Assistant Examiner* — Mickey France
(74) *Attorney, Agent, or Firm* — Cantor Colburn LLP

(57) ABSTRACT

An exhaust gas treatment system for an internal combustion engine is provided and includes an exhaust gas conduit, a hydrocarbon supply, a particulate filter ("PF"), at least one sensor, a first temperature sensor, a second temperature sensor, and a control module. The PF is in fluid communication with the exhaust gas conduit and has a filter structure for removal of particulates in the exhaust gas. The filter structure has an innermost region and an outermost region. The PF is selectively regenerated during operation of the internal combustion engine. The PF has a stratified temperature structure that causes the particulates trapped at the innermost region of the PF burn off before the particulates trapped in the outermost region of the PF during regeneration. The control module has a memory with an infinite stage temperature control curve stored thereon.

20 Claims, 2 Drawing Sheets

(56) References Cited

U.S. PATENT DOCUMENTS

| | | | |
|---|---|---|---|
| 2003/0167755 A1* | 9/2003 | Nakatani et al. | 60/288 |
| 2005/0188686 A1* | 9/2005 | Saito et al. | 60/297 |
| 2005/0198944 A1* | 9/2005 | Saitoh et al. | 60/295 |
| 2005/0210848 A1* | 9/2005 | Kuki et al. | 55/523 |
| 2005/0217240 A1* | 10/2005 | Naik | 60/274 |
| 2005/0252198 A1* | 11/2005 | Okugawa et al. | 60/284 |
| 2005/0284142 A1* | 12/2005 | Patil et al. | 60/311 |
| 2006/0042237 A1* | 3/2006 | Nonoyama et al. | 60/297 |
| 2007/0266701 A1* | 11/2007 | Cheng | 60/295 |
| 2007/0271902 A1* | 11/2007 | Noirot et al. | 60/273 |
| 2007/0283681 A1* | 12/2007 | Makkee et al. | 60/274 |
| 2008/0104948 A1* | 5/2008 | Kapparos et al. | 60/297 |
| 2009/0056316 A1* | 3/2009 | Haseyama et al. | 60/286 |
| 2009/0178390 A1* | 7/2009 | Yahata et al. | 60/285 |
| 2009/0255233 A1* | 10/2009 | Yoshida et al. | 60/286 |
| 2011/0061371 A1* | 3/2011 | Cavataio et al. | 60/286 |
| 2011/0099976 A1* | 5/2011 | Park | 60/274 |
| 2011/0146245 A1* | 6/2011 | Farman et al. | 60/286 |
| 2011/0209460 A1* | 9/2011 | He et al. | 60/274 |
| 2012/0137661 A1* | 6/2012 | Lee et al. | 60/286 |
| 2012/0144806 A1* | 6/2012 | Hamamatsu et al. | 60/278 |
| 2012/0198824 A1* | 8/2012 | Nishioka et al. | 60/297 |
| 2012/0216507 A1* | 8/2012 | Nieuwstadt | 60/274 |

FOREIGN PATENT DOCUMENTS

| | | |
|---|---|---|
| DE | 102008035762 A1 | 3/2009 |
| DE | 102009041688 A1 | 4/2010 |
| DE | 102010015385 A1 | 12/2010 |
| EP | 1582709 A2 | 10/2005 |
| FR | 2906301 | 3/2008 |

* cited by examiner

STRATIFIED PARTICULATE FILTER REGENERATION SYSTEM

FIELD OF THE INVENTION

Exemplary embodiments of the present invention relate to exhaust gas treatment systems for internal combustion engines and, more particularly, to an exhaust gas treatment system having a stratified particular filter ("PF") that selectively regenerates during operation of an internal combustion engine.

BACKGROUND

The exhaust gas emitted from an internal combustion engine is a heterogeneous mixture that contains gaseous emissions such as carbon monoxide ("CO"), unburned hydrocarbons ("HC") and oxides of nitrogen ("$NO_x$") as well as condensed phase materials (liquids and solids) that constitute particulate matter ("PM"). An exhaust treatment technology in use for high levels of particulate mater reduction may include a particulate filter ("PF") that traps particulate matter. Regeneration is the process of removing the accumulated particulate matter from the PF. However, uncontrolled regeneration may occur during certain operation conditions. Specifically, if the engine speed drops to idle during regeneration, the exhaust gas flowing through the PF will significantly decrease, while at the same time the concentration of oxygen in the PF will increase. Because the regeneration that is in progress creates an elevated substrate temperature of the PF, the combination of decreased flow rate and increasing oxygen concentration may create an uncontrolled reaction that elevates the PF to a higher temperature. Such high temperature gradients tend to increase the stress of the PF. Repeated thermal shock may create a cumulative effect that may eventually lead to cracking of the substrate of the PF. In some instances, even a single drop-to-idle event may potentially create a temperature gradient that cracks the substrate of the PF.

Two stage or three stage regeneration of a PF takes place when the temperature set point of the exhaust gas entering the PF is raised in increments depending on the temperature and the soot loading of the PF. However, multi-stage regeneration does not take into account that soot loading of the PF will continuously change during regeneration. Thus, because the temperature set point is set based on the soot loading before regeneration, the temperature of the PF during regeneration is typically lower than what is needed for high regeneration efficiency. Moreover, the substrate of the PF has a stratified temperature, where the temperature gradually decreases from the center to the outer surface of the PF. The stratified temperature of the PF results in different soot burning rates throughout the PF. Multi-stage regeneration does not take into account the stratified temperature of the PF substrate. Accordingly, it is desirable to provide an efficient approach to regenerate a PF, while at the same time minimizing the temperature gradient and risk of uncontrolled regeneration in the PF.

SUMMARY OF THE INVENTION

In one exemplary embodiment of the invention an exhaust gas treatment system for an internal combustion engine is provided, and includes an exhaust gas conduit, a hydrocarbon supply, a particulate filter ("PF"), at least one sensor, a first temperature sensor, a second temperature sensor, and a control module. The exhaust gas conduit is in fluid communication with, and is configured to receive an exhaust gas from the internal combustion engine. The hydrocarbon supply is connected to and in fluid communication with the exhaust gas conduit. The hydrocarbon supply is selectively adjustable for delivery of a hydrocarbon to control an exhaust gas temperature. The PF is in fluid communication with the exhaust gas conduit and has a filter structure for removal of particulates in the exhaust gas. The filter structure has an innermost region and an outermost region. The PF is selectively regenerated during operation of the internal combustion engine. The PF has a stratified temperature structure that causes the particulates trapped at the innermost region of the PF burn off before the particulates trapped in the outermost region of the PF during regeneration. The control module has a memory with an infinite stage temperature control curve stored thereon.

The at least one sensor is in communication with the exhaust gas conduit. The at least one sensor detects an operating condition of the PF, and generates a signal indicative of the amount of particulates trapped within the filter structure of the PF. The first temperature sensor and the second temperature sensor are both in communication with the exhaust gas conduit. The first temperature sensor is disposed upstream of the PF and the second temperature sensor is disposed downstream of the PF. The control module is in communication with the hydrocarbon supply, the at least one sensor, the first temperature sensor, and the second temperature sensor. The control module has a memory with an infinite stage temperature control curve stored thereon. The temperature control curve indicates a temperature set point upstream of the PF. The temperature set point continuously changes to correspond to the amount of particulates remaining trapped within the filter structure of the PF during regeneration. The temperature control curve is based on at least the stratified temperature structure of the PF, the particulates trapped in the innermost region of the PF and the particulates trapped in the outermost region of the PF.

The control module includes a control logic for continuously monitoring the at least one sensor for the amount of particulates trapped within the filter structure of the PF and determining if the amount of particulates trapped within the filter structure exceed a threshold particulate value. The control modules also includes a control logic for continuously monitoring the first temperature sensor for a first temperature reading and the second temperature sensor for a second temperature reading. The control module includes a control logic for initiating regeneration of the PF if the amount of particulates trapped within the filter structure of the PF exceeds the threshold particulate value and if the first and second temperature readings exceed a threshold PF temperature. The control module also includes a control logic for correlating a temperature sensed from the first temperature sensor to the temperature set point of the temperature control curve. The temperature set point of the temperature control curve is adjustable based on the amount of particulates trapped within the filter structure of the PF and the temperature at the first temperature sensor. The controller also includes a control logic for continuously adjusting the hydrocarbon supply for delivery of hydrocarbons to control the exhaust gas temperature based on the temperature set point of the temperature control curve.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
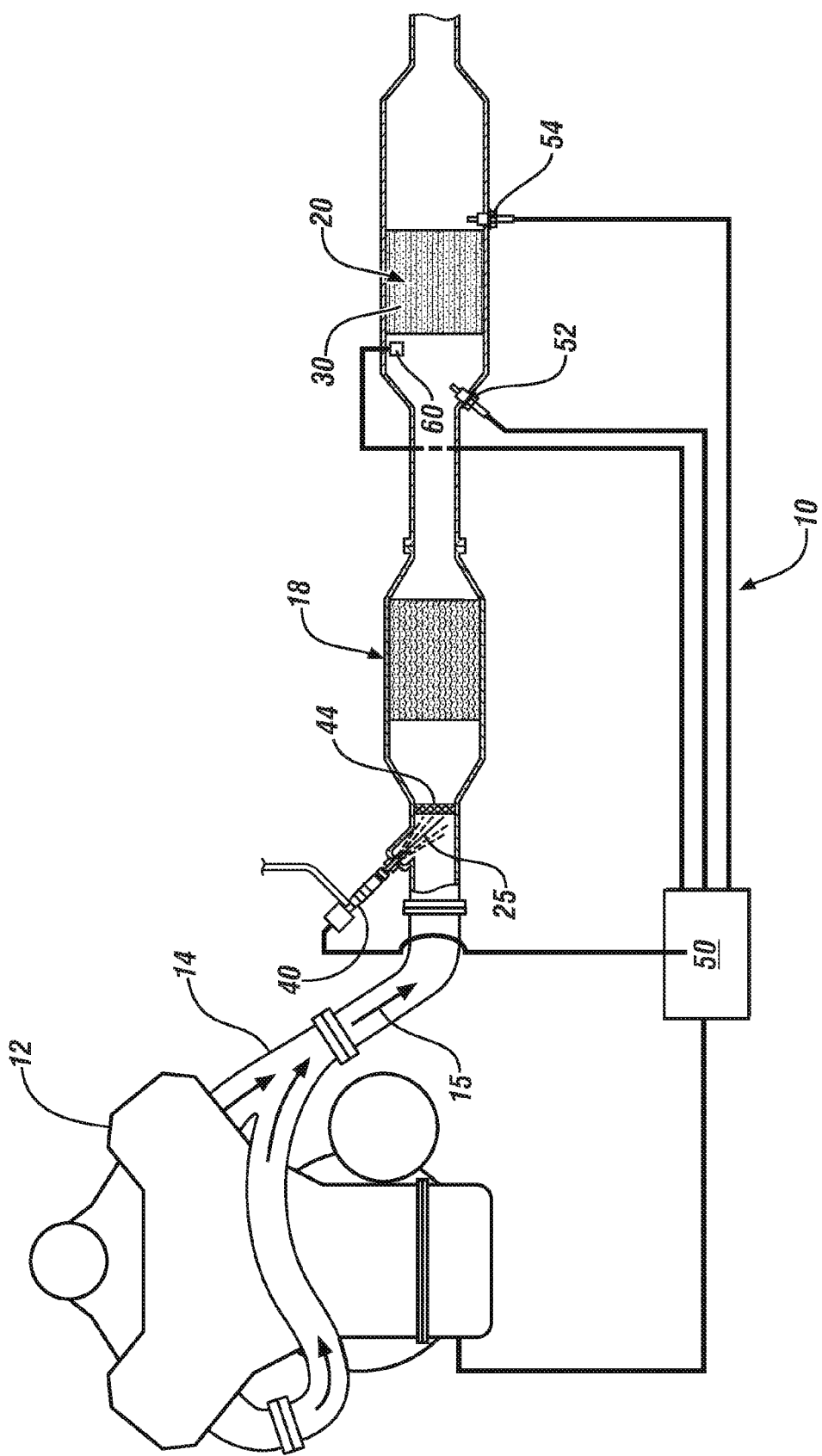
FIG. 1 is an exemplary illustration of an exhaust gas treatment system having a particulate filter device ("PF") and a control module.

The following description is merely exemplary in nature and is not intended to limit the present disclosure, its application or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, an exemplary embodiment is directed to an exhaust gas treatment system 10, for the reduction of regulated exhaust gas constituents of an internal combustion (IC) engine 12. The exhaust gas treatment system 10 described herein can be implemented in various engine systems implementing a particulate filter. Such engine systems may include, but are not limited to, diesel engine systems, gasoline direct injection systems, and homogeneous charge compression ignition engine systems.

The exhaust gas treatment system 10 generally includes one or more exhaust gas conduits 14, and one or more exhaust treatment devices. In the embodiment as illustrated, the exhaust gas treatment system devices include an oxidation catalyst device ("OC") 18 and a particulate filter device ("PF") 20. As can be appreciated, the exhaust gas treatment system 10 of the present disclosure may include various combinations of one or more of the exhaust treatment devices shown in FIG. 1, and/or other exhaust treatment devices (not shown), and is not limited to the present example.

In FIG. 1, the exhaust gas conduit 14, which may comprise several segments, transports exhaust gas 15 from the IC engine 12 to the various exhaust treatment devices of the exhaust gas treatment system 10. The OC 18 may include, for example, a flow-through metal or ceramic monolith substrate that is wrapped in an insulation mat or other suitable support that expands when heated, securing and insulating the substrate. The substrate may be packaged in a stainless steel shell or canister having an inlet and an outlet in fluid communication with exhaust gas conduit 14. The substrate can include an oxidation catalyst compound disposed thereon. The oxidation catalyst compound may be applied as a wash coat and may contain platinum group metals such as platinum (Pt), palladium (Pd), rhodium (Rh) or other suitable oxidizing catalysts, or combination thereof. The OC 18 is useful in treating unburned gaseous and non-volatile HC and CO, which are oxidized to form carbon dioxide and water.

An HC or fuel injector 40 may be located upstream of the OC 18 in fluid communication with the exhaust gas 15 in the exhaust gas conduit 14. The fuel injector 40 is in fluid communication with an HC supply (not shown), and is configured to introduce an unburned HC 25 into the exhaust gas stream for delivery to the OC 18. A mixer or turbulator 44 may also be disposed within the exhaust conduit 14, in close proximity to the HC injector 40, to further assist in thorough mixing of the HC 25 with the exhaust gas 15 to create an exhaust gas and hydrocarbon mixture.

The PF 20 may be disposed downstream of the OC 18. The PF 20 operates to filter the exhaust gas 15 of carbon and other particulates. In various embodiments, the PF 20 may be constructed using a ceramic wall flow monolith filter 30 that is wrapped in an insulation mat or other suitable support that expands when heated, securing and insulating the filter 30. The filter 30 may be packaged in a shell or canister that is, for example, stainless steel, and that has an inlet and an outlet in fluid communication with exhaust gas conduit 14. In one exemplary embodiment, the filter 30 is constructed from a Cordierite based material, however it is understood that other types of materials may be used as well.

The ceramic wall flow monolith filter 30 may have a plurality of longitudinally extending passages that are defined by longitudinally extending walls. The passages include a subset of inlet passages that have and open inlet end and a closed outlet end, and a subset of outlet passages that have a closed inlet end and an open outlet end. Exhaust gas 15 entering the filter 30 through the inlet ends of the inlet passages is forced to migrate through adjacent longitudinally extending walls to the outlet passages. It is through this wall flow mechanism that the exhaust gas 15 is filtered of carbon and other particulates. The filtered particulates are deposited on the longitudinally extending walls of the inlet passages and, over time, will have the effect of increasing the exhaust gas backpressure experienced by the IC engine 12. It is appreciated that the ceramic wall flow monolith filter is merely exemplary in nature and that the PF 20 may include other filter devices such as wound or packed fiber filters, open cell foams, sintered metal fibers, etc. The increase in exhaust backpressure caused by the accumulation of particulate matter in the monolith filter 30 typically requires that the PF 20 is periodically cleaned, or regenerated. Regeneration involves the oxidation or burning of the accumulated carbon and other particulates in what is typically a high temperature environment (>600° C.).

A control module 50 is operably connected to and monitors the engine 12 and the exhaust gas treatment system 10 through a number of sensors. Specifically, FIG. 1 illustrates the control module 50 in communication with two temperature sensors 52, 54 located in the exhaust gas conduit 14 as well as a backpressure sensor 60. A first temperature sensor 52 is situated downstream of the OC 18 and upstream of the PF 20, and a second temperature sensor 54 is situated downstream of both the first temperature sensor 52 and the PF 20. The temperature sensors 52, 54 send electrical signals to the control module 50 that each indicate the temperature in the exhaust gas conduit 14 in specific locations.

The backpressure sensor 60 is located upstream of the PF 20 and generates a signal indicative of the carbon loading and particulate loading in the monolith filter 30. It should be noted that while FIG. 1 illustrates a backpressure sensor 60 for determining carbon loading in the monolith filter 30, other approaches may be used as well for determining carbon loading. For example, in an alternative embodiment, a delta pressure sensor may be used instead to measure the differential pressure across the PF 20. The control module 50 includes control logic for continuously monitoring the backpressure sensor 60, the first temperature sensor 52 and the second temperature sensor 54. Specifically, the control module 50 includes control logic for monitoring the backpressure sensor 60 for the amount of particulates trapped within the monolith filter 30 of the PF 20. The control module 50 further includes control logic for continuously monitoring the first temperature sensor 52 for a first temperature reading and the second temperature sensor 54 for a second temperature reading.

Figure 3:
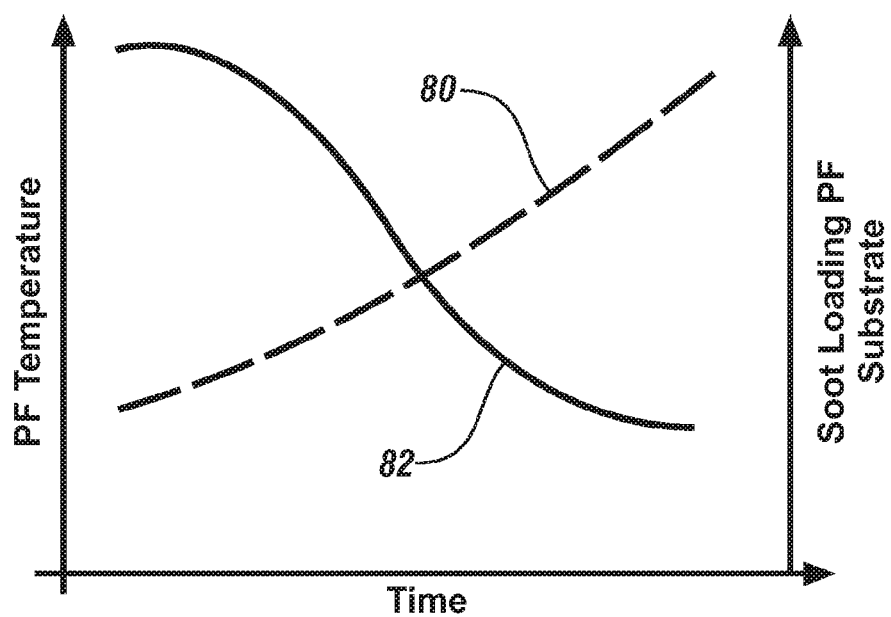
FIG. 3 is an illustration of a temperature control curve that is stored in a memory of the control module illustrated in FIG. 1.

The control module 50 includes control logic for initiating the regeneration of the PF 20. Regeneration occurs if the amount of particulates trapped within the monolith filter 30 of the PF 20 exceeds a threshold pressure value indicative of the need to regenerate, as well as if the first and second temperature readings from the first and second temperature sensors 52 and 54 exceed a threshold temperature value indicative of the need to regenerate. Upon a determination that the backpressure and the first and second temperature readings of the PF 22 have reached the respective threshold levels indicative of the need to regenerate the PF 22, the controller 50 includes control logic for raising the temperature of the exhaust gas 14 to a level suitable for regeneration of the carbon and particulate matter in the monolith filter 30. The raised temperature of the exhaust gas 14 is based on an infinite stage temperature control curve 80, which is illustrated in FIG. 3, and is discussed in greater detail below. Specifically, in one embodiment the control module 50 is in communication with the fuel injector 40. The control module 50 includes control logic for controlling the amount of hydrocarbon or fuel 25 injected into the exhaust gas stream 15 by the fuel injector 40 for controlling the exhaust gas 15 temperature. It is contemplated that, in some circumstances the fuel injector 40 may be omitted and the controller 50 may include control logic for continuously adjusting the operating parameters of the engine 12 such as, for example, fuel injection timing and quantity, for controlling the exhaust gas 15 temperature.

Figure 2:
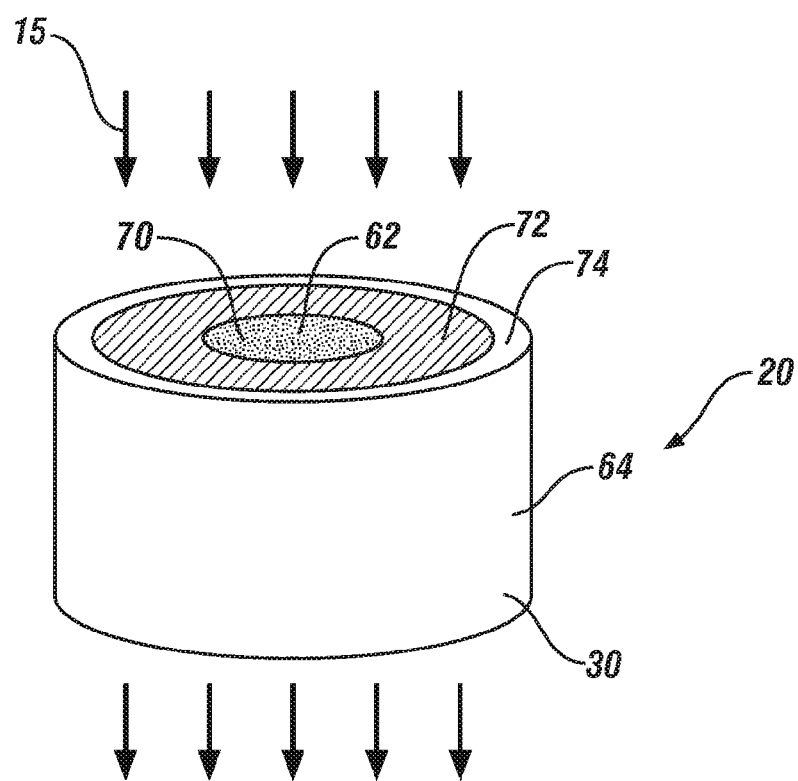
FIG. 2 is an illustration of the PF shown in FIG. 1.

Turning now to FIG. 2, an exemplary PF 20 is shown in cross flow with the exhaust gas 15. The PF 20 has a stratified temperature, which means that the temperature of the PF 20 gradually decreases from a center portion 62 to an outer surface 64 of the PF 20. The stratified temperature of the PF 20 results in different particulate burning rates throughout the PF 20 during regeneration. In the embodiment as shown, the PF 20 includes an innermost region 70, a middle region 72, and an outermost region 74. Similarly, the particulates trapped at the innermost region 70 of the PF 20 burn off before the particulates trapped in the outermost region 74 of the PF 20 during regeneration due to the stratified temperature of the PF 20. The stratified temperature structure also causes the particulates trapped at the innermost region 70 of the PF 20 to burn off more quickly than the particulates trapped in the middle region 72. The particles trapped in the middle region 72 burn off more quickly than the particles trapped in the outermost region 74 of the PF 20. For example, in one illustrative embodiment the temperature of the innermost region 70 may be about 615° C., the middle region 72 may be between about 575° C. to about 600° C., and the outermost region 74 may be between about 490° C. to about 550° C. during regeneration, however it is to be understood that other temperature ranges may be used as well.

FIG. 3 is an exemplary illustration of the infinite stage temperature control curve 80 that is stored in a memory of the control module 50 (shown in FIG. 1). The temperature control curve 80 indicates a temperature set point upstream of the PF 20 (shown in FIG. 1) at a given point in time during regeneration. The temperature set point is a specific point located on the temperature control curve 80 that continuously changes to correspond to the amount of particulates that remain trapped within the monolith structure 30 of the PF 20 (shown in FIG. 1) during regeneration. The amount of particulates remaining trapped within the monolith structure 30 of the PF 20 during regeneration is illustrated as a particulate curve 82. The amount of particulates remaining trapped within the monolith structure 30 of the PF 20 will decrease as a function of time during regeneration of the PF 20; which is shown by the particulate curve 82.

Referring now to both of FIGS. 2 and 3, the temperature control curve 80 is based at least on the stratified temperature of the PF 20 (shown in FIG. 2), as well as the amount of particulates trapped within the PF 20 during regeneration. Specifically, the temperature control curve 80 takes into account the stratified temperature of the PF 20 as the PF 20 gradually decreases in temperature from the center portion 62 to the outer surface 64 (shown in FIG. 2). For example, in one embodiment, the temperature control curve 80 may be based on test data collected by monitoring various locations of the PF 20 in each of the innermost region 70, the middle region 72, and the outermost region 74.

The temperature control curve 80 is also based on the stratified configuration of the particulates remaining trapped within the PF 20 during regeneration. The amount of particulates trapped in the PF 20 gradually decrease from the center portion 62 to an outer surface 64 (shown in FIG. 2). That is, the temperature control curve 80 is also based on the amount of particulates that are trapped within the PF 20 in each of the innermost region 70, the middle region 72, and the outermost region 74, where the trapped particulates vary based on the specific regions 70, 72, and 74 of the PF 20. The particulates trapped within the PF 20 burn off as a function of temperature, local particulate loading, and oxygen ("$O_2$") concentration. Thus, the particulates trapped in the center portion 62 of the PF 20 burn off more quickly than the particulates trapped in the outer surface 64 of the PF 20. In one embodiment, a model of the particulate burn rate of the PF 20 may be modeled based on test data collected by monitoring the temperature, local particulate loading, and oxygen ("$O_2$") concentration. Testing may be conducted by monitoring various locations of the PF 20 in each of the innermost region 70, the middle region 72, and the outermost region 74 for temperature, local particulate loading, and oxygen ("$O_2$") concentration.

The temperature control curve 80 may also be based on a regeneration time of the PF 20. The regeneration time is the amount of time needed for the PF to completely regenerate. The temperature control curve 80 may also be based on the material properties of the PF 20 as well. Specifically, the temperature control curve 80 may take into account the temperature limit of the material that the monolith filter 30 of the PF 20 is constructed from. The temperature control curve 80 may also be based on the particulate oxidization rate of the particulates trapped within the PF 20 as well. The particulate oxidization rate depends at least on the temperature of the exhaust gas 15 (shown in FIG. 1) entering the PF 20. The particulate oxidization is an exothermic reaction that produces more heat the faster particulate oxidization takes place. The temperature control curve 80 may also be based on an airflow rate into the PF 20. Specifically, the airflow rate may be monitored using a mass airflow sensor (not shown) that is in communication with the controller 50, which is used to determine the mass of air entering the engine 12.

During regeneration of the PF 20, the control module 50 includes control logic for correlating a temperature sensed by the first temperature sensor 52 to the temperature set point of the temperature control curve 80. The temperature set point of the temperature control curve 80 is adjustable based on the amount of particulates trapped within the monolith filter 30 of the PF 20 (FIG. 1), and the temperature at the first temperature sensor 52 (FIG. 1). The control module 50 further includes a control logic for continuously adjusting the plurality of operating parameters of the engine 12 (shown in FIG. 1) to control the temperature of the exhaust gas 15 based on the temperature set point of the temperature control curve 80. Thus, during regeneration, the amount of particulates remaining trapped within the PF 20 decreases as the temperature indicated by the first temperature sensor 52 increases. The control module 50 further includes control logic for continuously adjusting the plurality of operating parameters of the engine 12 (FIG. 1) such that the temperature at any location of the PF 20 does not exceed the material limit during regeneration. The material limit represents a maximum allowable temperature of the material that the monolith filter 30 of the PF 20 is constructed from. For example, with reference to FIG. 2, in the event that the monolith filter 30 of the PF 20 is constructed from a Cordierite based material, then the temperature of the PF 20 at the innermost region 70, the middle region 72, and the outermost region 74 will not typically exceed the material temperature limit of Cordierite.

The particulate oxidization of the PF 20 is an exothermic reaction that produces more heat the faster particulate oxidization takes place. Thus, high temperatures or rapid increases in the temperature within the PF 20 may result in undesired temperature excursions due to rapid particulate oxidization. However, because the temperature set point of the temperature control curve 80 continuously adjusts or increases based on the stratified temperature and particulate loading of the PF 20, the probability of such excursions occurring is substantially reduced or almost eliminated. Reduction of temperature excursions will also reduce the thermal shock experienced by the PF 20, which in turn reduces or substantially eliminates the occurrence of cracking of the filter 30 in the PF 20. Reducing the occurrence of cracking of the filter 30 will in turn improve durability and warranty of the PF 20. Moreover, because the temperature set point of the temperature control curve 80 continuously increases based on the stratified temperature and particulate loading of the PF 20, the particulate oxidization rate of the PF 20 may be increased. This is because the PF 20 is regenerated at the highest allowable temperature considering the material limits of the filter 30. Regenerating the PF 20 at the highest allowable temperatures facilitates shorter regeneration times. Shorter regeneration times result in improved fuel efficiency of the engine 12.

The temperature set point of the temperature control curve 80 continuously adjusts or increases such that the stratified temperature of the PF 20 does not exceed the material limits during regeneration. Specifically, referring to FIG. 2, the temperature in each of the innermost region 70, the middle region 72, and the outermost region 74 of the PF 20 does not generally exceed the material limits of the filter 30. Thus, the PF 20 may be constructed from materials having a lower temperature limit when compared to some of the other types of materials that are currently being used today. For example, in one embodiment a material such as Cordierite may be used in an application that was previously employing silicon carbide ("SiC").

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:
1. An exhaust gas treatment system for an internal combustion engine, comprising:
   an exhaust gas conduit in fluid communication with, and configured to receive an exhaust gas from the internal combustion engine;
   a hydrocarbon supply connected to and in fluid communication with the exhaust gas conduit, wherein the hydrocarbon supply is selectively adjustable for delivery of a hydrocarbon to control an exhaust gas temperature;
   a particulate filter ("PF") device in fluid communication with the exhaust gas conduit and having a filter structure for removal of particulates in the exhaust gas, the filter structure having an innermost region and an outermost region, the PF being selectively regenerated during operation of the internal combustion engine, the PF having a stratified temperature structure that causes the particulates trapped at the innermost region of the PF to burn off before the particulates trapped in the outermost region of the PF during regeneration;
   at least one sensor in communication with the exhaust gas conduit, wherein the at least one sensor detects an operating condition of the PF, and wherein the at least one sensor generates a signal indicative of the amount of particulates trapped within the filter structure of the PF;
   a first temperature sensor and a second temperature sensor both in communication with the exhaust gas conduit, wherein the first temperature sensor is disposed upstream of the PF and the second temperature sensor is disposed downstream of the PF; and
   a control module in communication with the hydrocarbon supply, the at least one sensor, the first temperature sensor, and the second temperature sensor, the control module having a memory with an infinite stage temperature control curve stored thereon, the temperature control curve indicating a temperature set point upstream of the PF, the temperature set point continuously changing to correspond to the amount of particulates remaining trapped within the filter structure of the PF during regeneration, wherein the temperature control curve is based on at least the stratified temperature structure of the PF, the particulates trapped in the innermost region of the PF, and the particulates trapped in the outermost region of the PF, the control module comprising:
      a control logic for continuously monitoring the at least one sensor for the amount of particulates trapped within the filter structure of the PF and determining if the amount of particulates trapped within the filter structure exceed a threshold particulate value;
      a control logic for continuously monitoring the first temperature sensor for a first temperature reading and the second temperature sensor for a second temperature reading;
      a control logic for initiating regeneration of the PF if the amount of particulates trapped within the filter structure of the PF exceeds the threshold particulate value and if the first and second temperature readings exceed a threshold PF temperature;
      a control logic for correlating a temperature sensed from the first temperature sensor to the temperature set point of the temperature control curve, wherein the temperature set point of the temperature control curve is adjustable based on the amount of particulates trapped within the filter structure of the PF and the temperature at the first temperature sensor; and
      a control logic for continuously adjusting the hydrocarbon supply for delivery of hydrocarbons to control the exhaust gas temperature based on the temperature set point of the temperature control curve.

2. The exhaust gas treatment system of claim 1, wherein the PF includes a middle region, wherein the stratified temperature structure of the PF causes the particulates trapped at the innermost region of the PF burn off more quickly than the particulates trapped in the middle region, and wherein the particles trapped in the middle region burn off more quickly than the particles trapped in the outermost region.

3. The exhaust gas treatment system of claim 2, wherein the temperature control curve is based on test data, wherein the test data is created by monitoring the PF in each of the innermost region, the middle region, and the outermost region of the PF.

4. The exhaust gas treatment system of claim 1, wherein the filter structure of the PF is constructed from a Cordierite material.

5. The exhaust gas treatment system of claim 1, wherein the temperature control curve is further based on a regeneration time, wherein the regeneration time represents an amount of time needed to complete regeneration of the PF.

6. The exhaust gas treatment system of claim 1, wherein the temperature control curve is further based on material properties of the filter structure of the PF.

7. The exhaust gas treatment system of claim 1, wherein the temperature control curve is further based on a particulate oxidization rate of the PF.

8. The exhaust gas treatment system of claim 1, wherein the temperature control curve is further based on an airflow rate into the PF.

9. The exhaust gas treatment system of claim 1, wherein the controller includes control logic for continuously adjusting the exhaust gas temperature such that the PF does not exceed a material limit during regeneration, wherein the material limit represents a maximum allowable temperature of the filter structure of the PF.

10. The exhaust gas treatment system of claim 1, wherein the at least one sensor is one of a backpressure sensor and a delta pressure sensor.

11. The exhaust gas treatment system of claim 1, further comprising an oxidation catalyst device ("OC") located upstream of the PF and in fluid communication with the exhaust gas conduit, and wherein the OC device is selectively activated to induce oxidization of the exhaust gas.

12. An exhaust gas treatment system for an internal combustion engine, comprising:
an exhaust gas conduit in fluid communication with, and configured to receive an exhaust gas from the internal combustion engine;
a hydrocarbon supply connected to and in fluid communication with the exhaust gas conduit, wherein the hydrocarbon supply is selectively adjustable for delivery of a hydrocarbon to control an exhaust gas temperature;
a particulate filter ("PF") device in fluid communication with the exhaust gas conduit and having a filter structure for removal of particulates in the exhaust gas, the filter structure having an innermost region, an outermost region, and a material limit that represents a maximum allowable temperature of the filter structure of the PF, the PF being selectively regenerated during operation of the internal combustion engine, the PF having a stratified temperature structure that causes the particulates trapped at the innermost region of the PF to burn off before the particulates trapped in the outermost region of the PF during regeneration, wherein the PF is regenerated within a regeneration time that represents an amount of time needed to complete regeneration of the PF;
an oxidation catalyst device ("OC") located upstream of the PF and in fluid communication with the exhaust gas conduit, wherein the OC device is selectively activated to induce oxidization of the exhaust gas;
a pressure sensor in communication with the exhaust gas conduit, wherein the pressure sensor detects an operating condition of the PF, and wherein the pressure sensor generates a signal indicative of the amount of particulates trapped within the filter structure of the PF;
a first temperature sensor and a second temperature sensor both in communication with the exhaust gas conduit, wherein the first temperature sensor is disposed upstream of the PF and the second temperature sensor is disposed downstream of the PF; and
a control module in communication with the hydrocarbon supply, the pressure sensor, the first temperature sensor, and the second temperature sensor, the control module having a memory with an infinite stage temperature control curve stored therein, the temperature control curve indicating a temperature set point upstream of the PF, the temperature set point continuously changing to correspond to the amount of remaining particulates trapped within the filter structure of the PF during regeneration, wherein the temperature control curve is based on at least the stratified temperature structure of the PF, the particulates trapped in the innermost region of the PF, the particulates trapped in the outermost region of the PF, and the regeneration time of the PF, the control module comprising:
a control logic for continuously monitoring the pressure sensor for the amount of particulates trapped within the filter structure of the PF and determining if the amount of particulates trapped within the filter structure exceed a threshold particulate value;
a control logic for continuously monitoring the first temperature sensor for a first temperature reading and the second temperature sensor for a second temperature reading;
a control logic for initiating regeneration of the PF if the amount of particulates trapped within the filter structure of the PF exceeds the threshold particulate value and if the first and second temperature readings exceed a threshold PF temperature;
a control logic for correlating a temperature sensed from the first temperature sensor to the temperature set point of the temperature control curve, wherein the temperature set point of the temperature control curve is adjustable based on the amount of particulates trapped within the filter structure of the PF and the temperature at the first temperature sensor; and
a control logic for continuously adjusting the hydrocarbon supply for delivery of hydrocarbons to control the exhaust gas temperature based on the temperature set point of the temperature control curve such that any point of the PF does not exceed the material limits of the filter structure of the PF.

13. The exhaust gas treatment system of claim 2, wherein the PF includes a middle region, wherein the stratified temperature structure of the PF causes the particulates trapped at the innermost region of the PF burn off more quickly than the particulates trapped in the middle region, and wherein the particles trapped in the middle region burn off more quickly than the particles trapped in the outermost region.

14. The exhaust gas treatment system of claim 13, wherein the temperature control curve is based on test data, wherein the test data is created by monitoring the PF in each of the innermost region, the middle region, and the outermost region of the PF.

15. The exhaust gas treatment system of claim 12, wherein the filter structure of the PF is constructed from a Cordierite material.

16. The exhaust gas treatment system of claim 12, wherein the temperature control curve is further based on a particulate oxidization rate of the PF.

17. The exhaust gas treatment system of claim 12, wherein the temperature control curve is further based on an airflow rate into the PF.

18. The exhaust gas treatment system of claim 12, wherein the pressure sensor is one of a backpressure sensor and a delta pressure sensor.

19. An exhaust gas treatment system for an internal combustion engine, comprising:
- an exhaust gas conduit in fluid communication with, and configured to receive an exhaust gas from the internal combustion engine;
- a hydrocarbon supply connected to and in fluid communication with the exhaust gas conduit, wherein the hydrocarbon supply is selectively adjustable for delivery of a hydrocarbon to control an exhaust gas temperature;
- a particulate filter ("PF") device in fluid communication with the exhaust gas conduit and having a filter structure for removal of particulates in the exhaust gas, the filter structure having an innermost region, a middle region, an outermost region, and a material limit that represents a maximum allowable temperature of the filter structure, the PF being selectively regenerated during operation of the internal combustion engine, the PF having a stratified temperature structure that causes the particulates trapped at the innermost region of the PF burn to off before the particulates trapped in the middle region of the PF, and the particulates trapped in the middle region of the PF burn off before the particulates trapped in the outermost region of the PF during regeneration, wherein the PF is regenerated within a regeneration time that represents an amount of time needed to complete regeneration of the PF;
- an oxidation catalyst device ("OC") located upstream of the PF and in fluid communication with the exhaust gas conduit, wherein the OC device is selectively activated to induce oxidization of the exhaust gas;
- a pressure sensor in communication with the exhaust gas conduit, wherein the pressure sensor detects an operating condition of the PF, and wherein the pressure sensor generates a signal indicative of the amount of particulates trapped within the filter structure of the PF;
- a first temperature sensor and a second temperature sensor both in communication with the exhaust gas conduit, wherein the first temperature sensor is disposed upstream of the PF and the second temperature sensor is disposed downstream of the PF; and
- a control module in communication with the hydrocarbon supply, the pressure sensor, the first temperature sensor, and the second temperature sensor, the control module having a memory with an infinite stage temperature control curve stored therein, the temperature control curve indicating a temperature set point upstream of the PF, the temperature set point continuously changing to correspond to the amount of particulates trapped within the filter structure of the PF during regeneration, wherein the temperature control curve is based on at least the stratified temperature structure of the PF, test data, material properties of the filter structure of the PF, a particulate oxidization rate of the PF, an airflow rate into the PF, the particulates remaining trapped in the innermost region of the PF, the middle region of the PF, the particulates trapped in the outermost region of the PF, and the regeneration time of the PF, and wherein the test data is created by monitoring the PF in each of the innermost region, the middle region, and the outermost region of the PF, the control module comprising:
  - a control logic for continuously monitoring the pressure sensor for the amount of particulates trapped within the filter structure of the PF and determining if the amount of particulates trapped within the filter structure exceed a threshold particulate value;
  - a control logic for continuously monitoring the first temperature sensor for a first temperature reading and the second temperature sensor for a second temperature reading;
  - a control logic for initiating regeneration of the PF if the amount of particulates trapped within the filter structure of the PF exceeds the threshold particulate value and if the first and second temperature readings exceed a threshold PF filter temperature;
  - a control logic for correlating a temperature sensed from the first temperature sensor to the temperature set point of the temperature control curve, wherein the temperature set point of the temperature control curve is adjustable based on the amount of particulates trapped within the filter structure of the PF and the temperature at the first temperature sensor; and
  - a control logic for continuously adjusting the hydrocarbon supply for delivery of hydrocarbons to control the exhaust gas temperature based on the temperature set point of the temperature control curve such that any point of the PF does not exceed the material limits of the filter structure of the PF.

20. The exhaust gas treatment system of claim 19, wherein the filter structure of the PF is constructed from a Cordierite material.

* * * * *